(12) United States Patent
Li

(10) Patent No.: US 9,679,095 B1
(45) Date of Patent: *Jun. 13, 2017

(54) LAYOUT DECOMPOSITION FOR MULTIPLE PATTERNING LITHOGRAPHY

(71) Applicant: Mentor Graphics Corporation, Wilsonville, OR (US)

(72) Inventor: Qiao Li, Lake Oswego, OR (US)

(73) Assignee: Mentor Graphics, A Siemens Business, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,089

(22) Filed: Sep. 22, 2014

Related U.S. Application Data

(63) Continuation-in-part of application No. 13/844,310, filed on Mar. 15, 2013, now Pat. No. 8,910,095.

(60) Provisional application No. 61/766,538, filed on Feb. 19, 2013.

(51) Int. Cl.
*G06F 17/50* (2006.01)

(52) U.S. Cl.
CPC ...... *G06F 17/5068* (2013.01); *G06F 17/5072* (2013.01); *G06F 17/5077* (2013.01); *G06F 17/5081* (2013.01)

(58) Field of Classification Search
CPC ............. G06F 17/5072; G06F 17/5077; G06F 17/5081
USPC .................. 716/123, 124, 125, 131, 105
See application file for complete search history.

(56) References Cited

U.S. PATENT DOCUMENTS

| | | | | |
|---|---|---|---|---|
| 8,484,607 | B1* | 7/2013 | Tang | G06F 17/5081 716/136 |
| 8,910,095 | B2* | 12/2014 | Li | G06F 17/50 716/51 |
| 9,158,885 | B1* | 10/2015 | Gray | G06F 17/5081 |
| 2011/0078638 | A1* | 3/2011 | Kahng | G03F 1/144 716/52 |
| 2013/0061183 | A1* | 3/2013 | Abou Ghaida | G06F 17/5068 716/52 |
| 2013/0263065 | A1* | 10/2013 | Chen | G06F 17/50 716/55 |
| 2014/0237436 | A1* | 8/2014 | Li | G06F 17/50 716/55 |

(Continued)

OTHER PUBLICATIONS

Kuang et al., "An Efficient Layout Decomposition Approach for Triple Patterning Lithography", DAC 13, May 29 to Jun. 7, 2013, ACM, 6 pages.*

(Continued)

*Primary Examiner* — Phallaka Kik

(57) ABSTRACT

Aspects of the disclosed techniques relate to techniques of layout decomposition for multiple patterning lithography. Data of a coloring graph are derived from layout data for a layout design. The coloring graph is simplified by repeatedly applying a plurality of graph simplification units. Each of the graph simplification units is configured to use a unique approach to simplify a graph. Based on the simplified coloring graph, the layout design is decomposed to generate decomposition information. The decomposition process may comprise applying a heuristic method for coloring if needed. The decomposition information may comprise information of one or more layout regions that cannot be decomposed.

18 Claims, 8 Drawing Sheets

Flow chart
400

(56) References Cited

U.S. PATENT DOCUMENTS

2015/0052490 A1* 2/2015 Cilingir ............... G03F 1/36
716/52
2015/0234974 A1* 8/2015 Dechene ............ G06F 17/5081
716/52

OTHER PUBLICATIONS

B. Yu, K. Yuan, B. Zhang, D. Ding, D. Pan, "Layout Decomposition for Triple Patterning Lithography", in ICCAS, 2011 IEEE/ACM International Conference on Digital Object Identifier.
Y.-S. Chang, J. Sweis, J.-C. Lai, C.-C. Lin, J. Yu, "Full Area Pattern Decomposition of Self-Aligned Double Patterning for 30nm Node NAND Flash Process", in Alternative Lithographic Technologies II, Proc. SPIE vol. 7637, 2010.
K. Lucas, C. Cork, B. Yu, G. Luk-Pat, B. Patiner, A. Miloslaysky, D. Pan, "Triple patterning in 10nm node metal lithography", SPIE, 2012.
K. Lucas, C. Cork, B. Yu, G. Luk-Pat, B. Painter, D. Pan, "Implications of triple patterning for 14nm node design and patterning", in Design for Manufacturability through Design-Process Integration VI, Proc. of SPIE, vol. 8327, 832703-1, 2012.
Lim et al., "Heuristic methods for graph coloring problems," ACM Symposium on Applied Computing, pp. 933-939.
D. D. Corkill, "Blackboard systems," AI Expert 6(9):40-47, Sep. 1991.

* cited by examiner

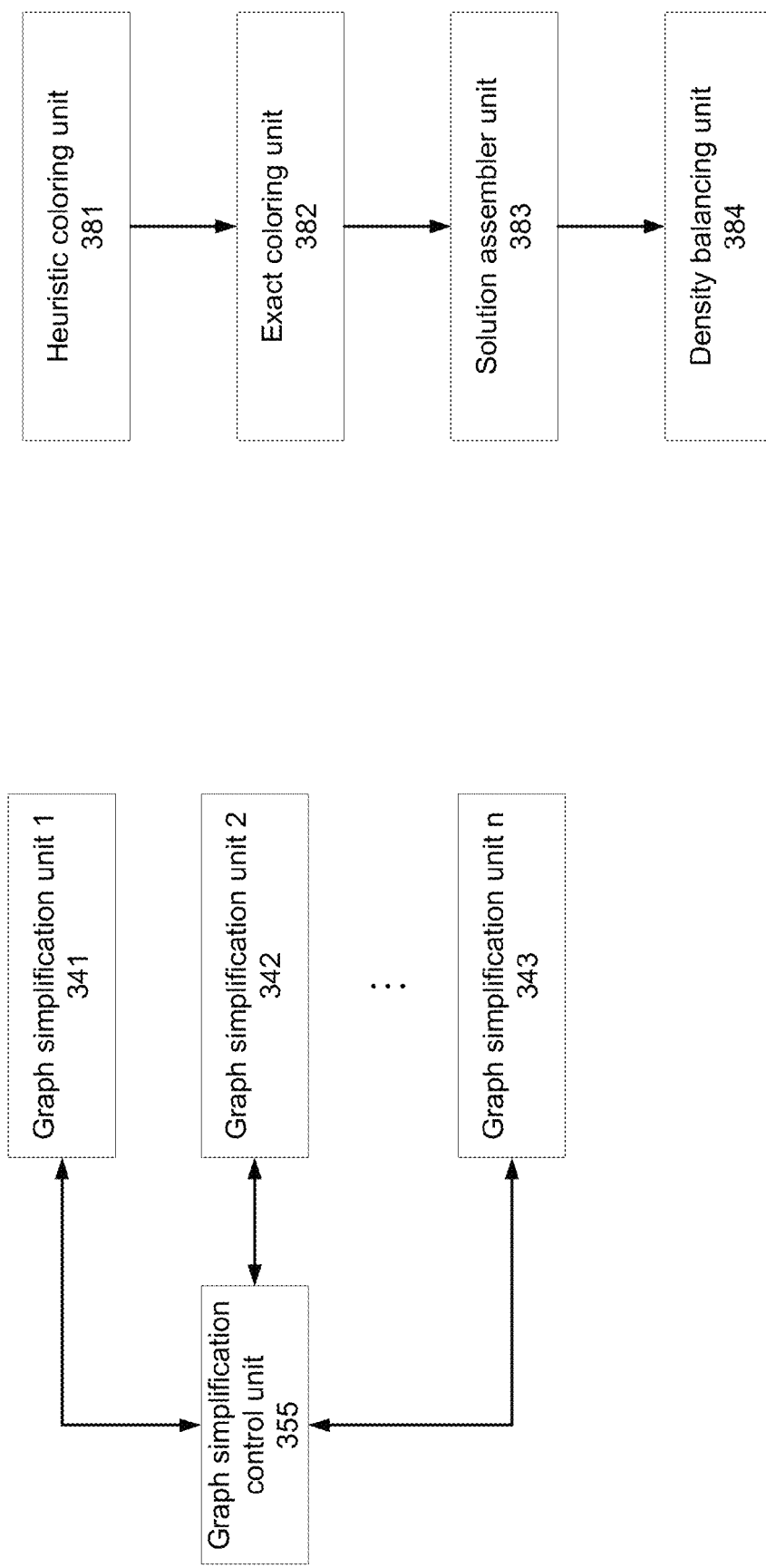

Flow chart 400

LAYOUT DECOMPOSITION FOR MULTIPLE PATTERNING LITHOGRAPHY

RELATED APPLICATIONS

This application is a continuation-in-part application of U.S. application Ser. No. 13/844,310, filed on Mar. 15, 2013, now U.S. Pat. No. 8,910,095, which claims benefit of U.S. Provisional Patent Application No. 61/766,538, filed on Feb. 19, 2012. Both of the applications are incorporated entirely herein by reference.

FIELD OF THE DISCLOSED TECHNIQUES

The disclosed techniques relates to photolithographic processing technologies. Various implementations of the disclosed techniques may be particularly useful for multiple patterning lithography.

BACKGROUND OF THE DISCLOSED TECHNIQUES

As the technology node advances, the traditional single exposure lithography is no longer a viable technique. At the 20 nm node, semiconductor manufacturers have adopted double patterning lithography techniques. Double patterning lithography decomposes a layout design into two portions for two masks (sometimes referred to as two colored portions), of which each is patterned with the existing 193 nm water immersion lithography. Not all existing layout designs, however, can be readily shrunk to the 20 nm node using double patterning lithography. This is because some parts of a layout design may not be decomposed into two colored portions that can maintain the double patterning compliance—the minimum space between layout features of the same color is two times that between layout features of different colors. Particularly challenging are two-dimensional layout features such as line-ends and via features.

In addition to difficulties in handling two-dimensional features, double patterning lithography may not be adequate even for one-dimensional layout features at the 14 nm node and below. While extreme ultra-violet (EUV) lithography and self-aligned double patterning are two possible options, the former is still not yet ready for manufacturing due to issues related to throughput, mask reflectivity and resist performance and the latter may restrict layout designs too much. As such, the triple patterning lithography appears to be a promising solution for handling designs for the 14 nm node and below. Even the quadruple patterning lithography has already been under development.

Triple patterning lithography typically employs a flow known as litho-etch-litho-etch-litho-etch (LELELE), a natural extension of double patterning lithography. The final substrate pattern is the logical OR of three successive lithography+etch sequences. By using the triple patterning lithography, further feature-size scaling can be achieved by reducing line-end-to-line spacing. Moreover, some layout features that do not have a conflict-free solution for double patterning lithography can be decomposed into three masks. Yet this does not mean layout decomposition is easier for the triple patterning lithography. In some sense, it is more difficult.

Layout decomposition for the double patterning lithography can be treated as a two-coloring problem in graph theory. The two-coloring problem is known to be computable in polynomial time. Layout decomposition for other multiple patterning lithography techniques, on the other hand, is essentially a multiple-coloring (other than two-coloring) problem and not solvable in polynomial time—an NP-complete problem. The solution time for such a problem increases exponentially with the number of nodes in the coloring graph. Therefore, rigorous full layout design decomposition algorithms such as the brute force method that tries all options are not practical. A simpler method for the triple patterning lithography, called the poor man's triple patterning method, reuses a two-coloring method and attempts to remove double patterning conflicts by adding the third color. This has the advantage of providing a good run time but does not provide good color balance or guarantee finding compliant solutions, for very dense layers like metal 1, even if they exist. Methods based on integer linear programming have been reported, which attempt to minimize the conflict number and/or the stitch number. These methods are also NP-complete and have poor scalability. Even with the reported acceleration techniques, turn-around time/memory performance still needs improvement. Challenges thus remain in developing effective layout decomposition techniques for the triple and more patterning lithography.

BRIEF SUMMARY OF THE DISCLOSED TECHNIQUES

Aspects of the disclosed techniques relate to techniques for layout decomposition for multiple patterning lithography. In one aspect, there is a method comprising: receiving layout data for a layout design, the layout design corresponding to at least a portion of an integrated circuit, the layout data comprising mask assignment information for some layout features; deriving data of a coloring graph from the layout data, the coloring graph comprising vertices for layout features in the layout design and edges between some pairs of vertices indicating the mask assignment information; applying repeatedly a plurality of graph simplification units to the coloring graph to derive a simplified coloring graph, wherein the applying repeatedly comprises applying one graph simplification unit in the plurality of graph simplification units to a part or a whole of the coloring graph to derive a first intermediate graph, applying one or more other graph simplification units in the plurality of graph simplification units to a part or a whole of the first intermediate graph to derive a second intermediate graph, and applying the one graph simplification unit again to a part or a whole of the second intermediate graph if the part or the whole of the second intermediate graph can be simplified by the one graph simplification unit, and wherein the applying repeatedly continues until no further simplification can be achieved or a user-defined termination condition is met; decomposing the layout design based on the simplified coloring graph to generate decomposition information; and storing the decomposition information.

The mask assignment information may comprise: mask assignment information derived based on device information, mask assignment information derived based on minimum spacing information, mask assignment information derived based on hierarchical information, mask assignment information derived based on cell information, or any combination thereof.

The plurality of graph simplification units may comprise some or all of: a graph simplification unit configured to simplify a graph by collapsing a pair of n-vertex complete graphs that share a (n−1)-vertex complete graph (n is less than or equal to the number of colors used for graph coloring), a graph simplification unit configured to simplify a graph by separating biconnected components, a graph simplification unit configured to simplify a graph by combining same color vertices, a graph simplification unit configured to simplify a graph by removing vertices of degree n (n is less than the number of colors used for graph coloring), a graph simplification unit configured to simplify a graph by separating subgraphs connected by n edges (n is less than the number of colors used for graph coloring), a graph simplification unit configured to simplify a graph by separating subgraphs that share and only share vertices of a complete graph on n vertices (n is less than or equal to the number of colors used for graph coloring), and a graph simplification unit configured to simplify a graph by separating subgraphs connected by n edges (n is greater than or equal to the number of colors used for graph coloring).

The decomposing may comprise: applying, if needed, a heuristic method for coloring. The decomposing may further comprise: applying an exact coloring algorithm if needed. The decomposition information may comprise information of one or more layout regions that cannot be decomposed In another aspect, there is a non-transitory processor-readable medium storing processor-executable instructions for causing one or more processors to perform the above method.

In still another aspect, there is a system, comprising: a coloring graph generation unit configured to derive data of a coloring graph from layout data for a layout design, the layout design corresponding to at least a portion of an integrated circuit, the layout data comprising mask assignment information for some layout features, the coloring graph comprising vertices representing layout features in the layout design and edges between some pairs of vertices indicating the mask assignment information; a graph simplification system configured to apply repeatedly a plurality of graph simplification units to the coloring graph to derive a simplified coloring graph, wherein the applying repeatedly comprises applying one graph simplification unit in the plurality of graph simplification units to a part or a whole of the coloring graph to derive a first intermediate graph, applying one or more other graph simplification units in the plurality of graph simplification units to a part or a whole of the first intermediate graph to derive a second intermediate graph, and applying the one graph simplification unit again to a part or a whole of the second intermediate graph if the part or the whole of the second intermediate graph can be simplified by the one graph simplification unit, and wherein the applying repeatedly continues until no further simplification can be achieved or a user-defined termination condition is met; and a layout decomposition unit configured to decompose the layout design based on the a simplified coloring graph generated by the graph reduction unit and/or the graph partitioning unit to generate decomposition information.

The plurality of graph simplification units may comprise some or all of the above noted seven graph simplification units.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclosed techniques may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 3C illustrates another configuration of the graph simplification system 350 in the layout decomposition system 300 that may be implemented according to various embodiments of the disclosed techniques.

FIG. 3D illustrates a configuration of the layout decomposition unit 380 in the layout decomposition system 300 that may be implemented according to various embodiments of the disclosed techniques.

In FIG. 7A, coloring subgraphs individually leads to the same color assigned to a pair of vertices for one of the two edges; in FIG. 7B, coloring subgraphs individually leads to the same color assigned to both pair of vertices for the two edges; in FIG. 7C, color permutation leads to a 3-colrong solution for the connected subgraphs.

DETAILED DESCRIPTION OF THE DISCLOSED TECHNIQUES

Figure 1:
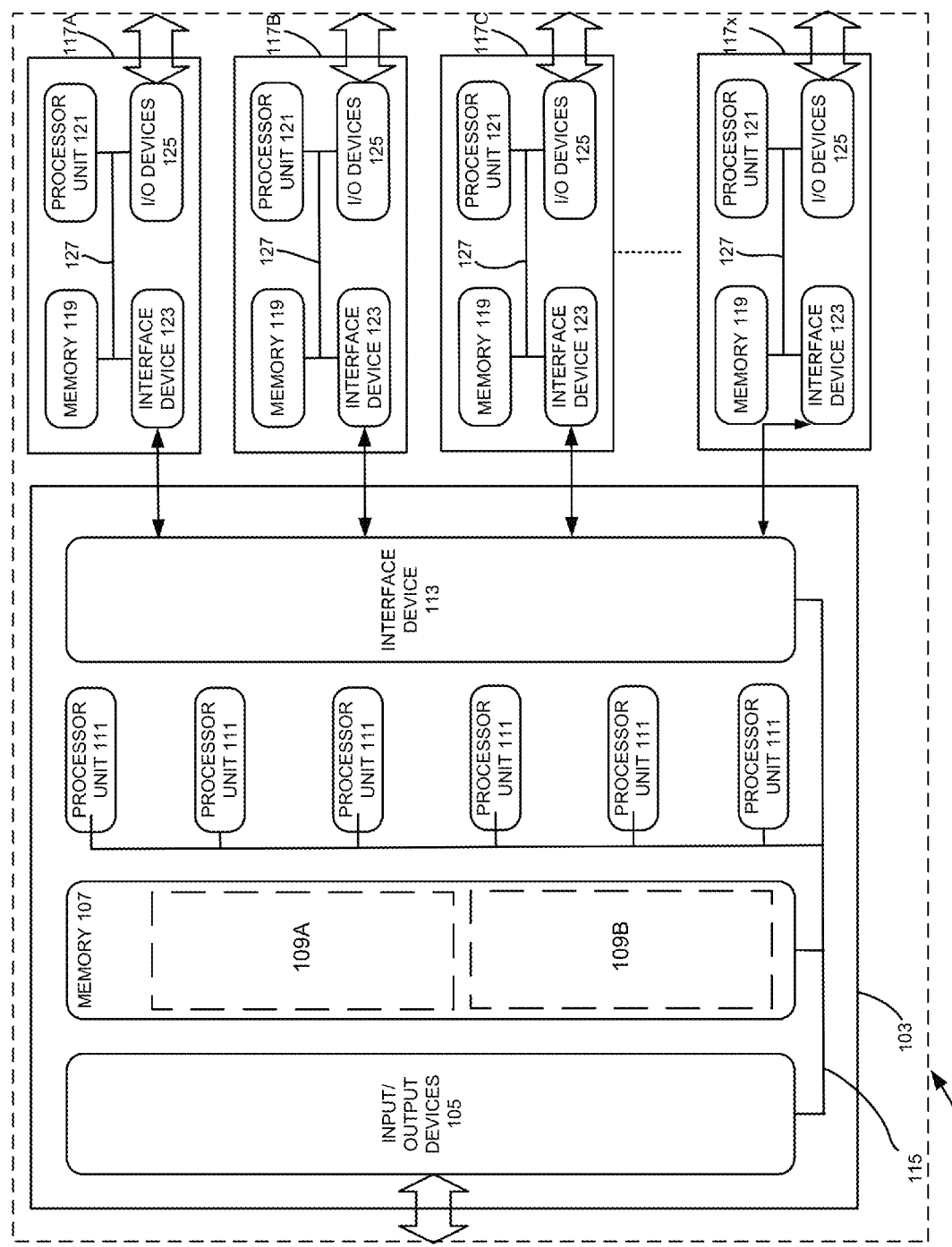
FIG. 1 illustrates an example of a computing system that may be used to implement various embodiments of the disclosed techniques.

Various aspects of the disclosed techniques relate to techniques of layout decomposition for multiple patterning lithography. In the following description, numerous details are set forth for purpose of explanation. However, one of ordinary skill in the art will realize that the disclosed techniques may be practiced without the use of these specific details. In other instances, well-known features have not been described in detail to avoid obscuring the disclosed techniques.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "derive," "apply" and "decompose" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate electronic design automation ("EDA") software tool (e.g., an automatic test pattern generation ("ATPG") tool). Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language. Any of the disclosed methods can alternatively be implemented (partially or completely) in hardware (e.g., an ASIC, PLD, or SoC).

Any data produced from any of the disclosed methods (e.g., intermediate or final test patterns, test patterns values, or control data) can be stored on computer-readable media (e.g., tangible computer-readable media, such as one or more CDs, volatile memory components (such as DRAM or SRAM), or nonvolatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked, and includes both direct connections or direct links and indirect connections or indirect links through one or more intermediate elements not affecting the intended operation of the circuit. Furthermore, the term "design" is intended to encompass data describing an entire microdevice, such as an integrated circuit device or micro-electromechanical system (MEMS) device. This term also is intended to encompass a smaller group of data describing one or more components of an entire microdevice, however, such as a layer of an integrated circuit device, or even a portion of a layer of an integrated circuit device. Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

Illustrative Operating Environment

The execution of various electronic design automation processes according to embodiments of the disclosed techniques may be implemented using computer-executable software instructions executed by one or more programmable computing devices. Because these embodiments of the disclosed techniques may be implemented using software instructions, the components and operation of a generic programmable computer system on which various embodiments of the disclosed techniques may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed techniques.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed techniques. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
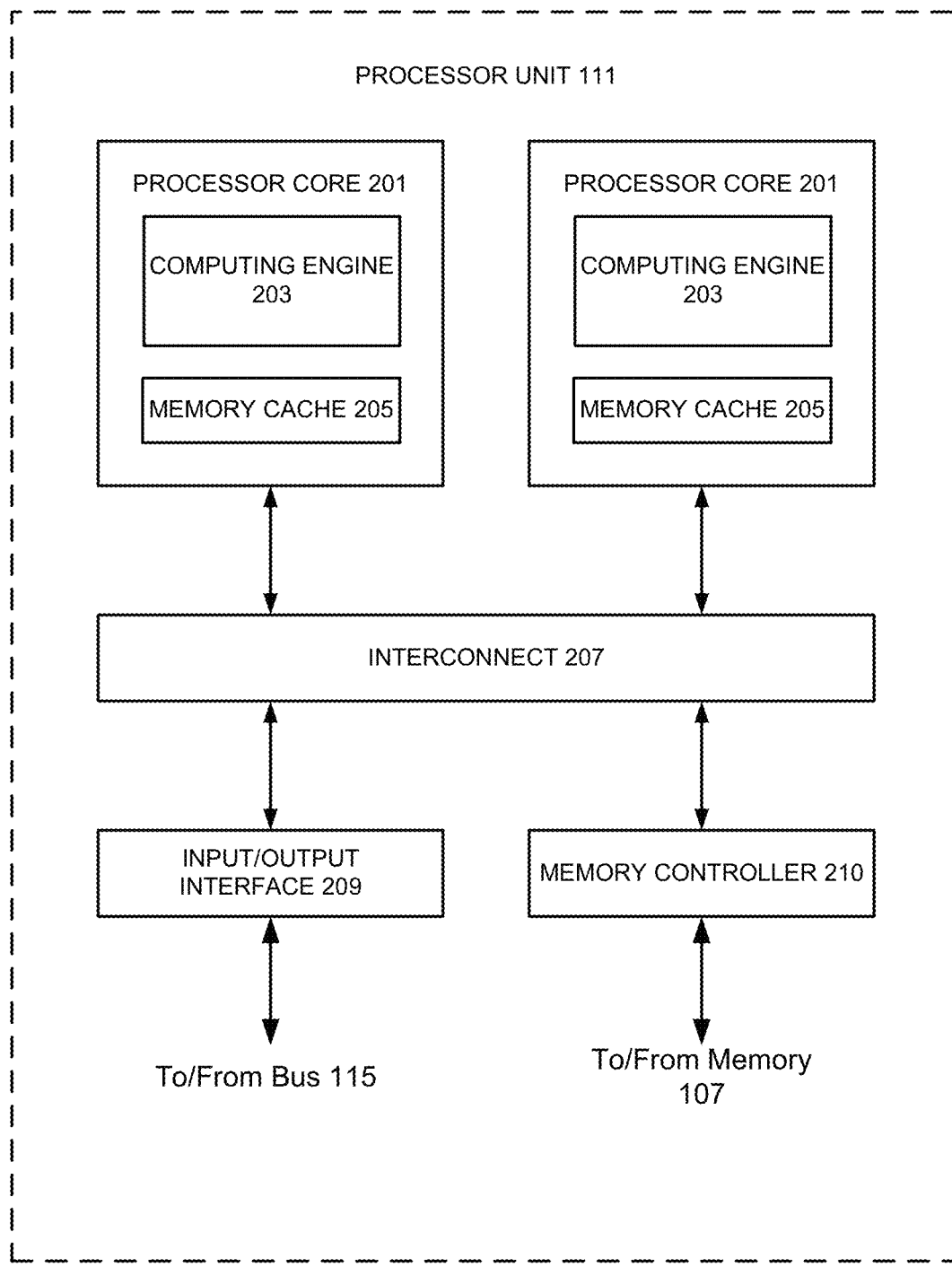
FIG. 2 illustrates an example of a multi-core processor unit that may be used to implement various embodiments of the disclosed techniques.

With some implementations of the disclosed techniques, the master computing device 103 may employ one or more processing units 111 having more than one processor core. Accordingly, FIG. 2 illustrates an example of a multi-core processor unit 111 that may be employed with various embodiments of the disclosed techniques. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed techniques, the processor units 111 may include additional components, such as a high-level cache memory accessible shared by the processor cores 201.

While FIG. 2 shows one illustration of a processor unit 111 that may be employed by some embodiments of the disclosed techniques, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed techniques may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed techniques, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed techniques may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed techniques, either the computer 103, one or more of the servant computers 117, or some combination of both may use two or more different interface devices 113 or 123 for communicating over multiple communication interfaces.

With various examples of the disclosed techniques, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed techniques, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed techniques.

Layout Decomposition Tool and Methods

Figures 3A, 3B:
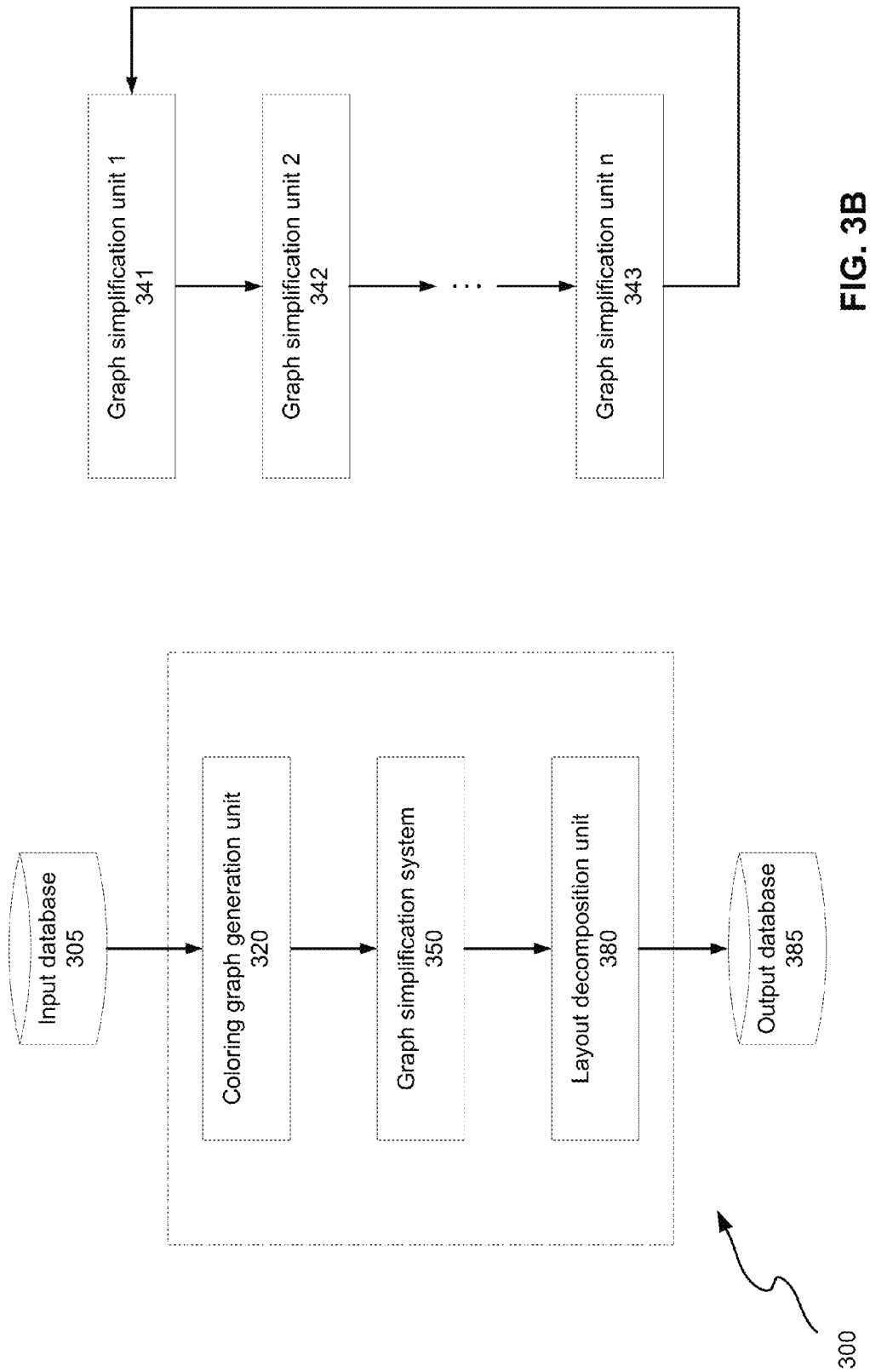
FIG. 3A illustrates an example of a layout decomposition tool that may be implemented according to various embodiments of the disclosed techniques.
FIG. 3B illustrates a configuration of the graph simplification system 350 in the layout decomposition system 300 that may be implemented according to various embodiments of the disclosed techniques.

FIG. 3A illustrates an example of a layout decomposition tool 300 for multiple patterning that may be implemented according to various embodiments of the disclosed techniques. As seen in this figure, the layout decomposition tool 300 includes a coloring graph generation unit 320, a graph simplification system 350, and a layout decomposition unit 380. As will be discussed in more detail below, the coloring graph generation unit 320 derives a coloring graph from a layout design. This translates a layout decomposition problem into a coloring problem. The graph simplification system 350 simplifies the coloring graph. Based on the simplified coloring graph which is more easily to color than the coloring graph, the layout decomposition unit 380 attempts to decompose the layout design.

The graph simplification system 350 may comprise one or more graph simplification units. Each of the one or more graph simplification units may use a unique method of graph simplification. The following are examples of the graph simplification units, some or all of which may be included in the graph simplification system 350: a graph simplification unit configured to simplify a graph by combining same color vertices, a graph simplification unit configured to simplify a graph by separating biconnected components, a graph simplification unit configured to simplify a graph by removing vertices of degree n (n is less than the number of colors used for graph coloring), a graph simplification unit configured to simplify a graph by collapsing a pair of n-vertex complete graphs that share a (n−1)-vertex complete graph (n is the number of colors for graph coloring), a graph simplification unit configured to simplify a graph by separating subgraphs connected by n edges (n is less than the number of colors used for graph coloring), a graph simplification unit configured to simplify a graph by separating subgraphs that share and only share vertices of a complete graph on n vertices (n is less than or equal to the number of colors used for graph coloring), and a graph simplification unit configured to simplify a graph by separating subgraphs connected by n edges (n is greater than or equal to the number of colors used for graph coloring). How each of these graph simplification units works will be discussed in detail later.

The multiple graph simplification units in the graph simplification system 350 may be arranged in a loop, as shown in FIG. 3B. A graph is processed in order and repeatedly by each of the multiple graph simplification units (341, 342 . . . 343). FIG. 3C illustrates another configuration of the graph simplification system 350 that may be employed by various embodiments of the disclosed techniques. In addition to graph simplification units 1–n, the graph simplification system 350 further comprises a graph simplification control unit 355. The graph simplification control unit 355 may manage the course of graph simplification by determining which of the multiple graph simplification units is applied to particular graph data. The determination may be based on a set of rules.

With some implementations of the disclosed techniques, the graph simplification system 350 comprises multiple graph simplification sub-systems. Each of the graph simplification sub-system comprises one or more graph simplification units. As such, the graph simplification operations may be performed in parallel. For example, after a graph is separated into two subgraphs by a graph simplification unit in one graph simplification sub-system, one of the subgraphs is processed continuously by the one graph simplification sub-system while the other subgraph is moved to another graph simplification sub-system for further simplification.

The layout decomposition unit 380 may comprise one or more of the following sub-units: a heuristic coloring unit, an exact coloring unit, a solution assembler unit and a density balancing unit. FIG. 3D illustrates a configuration of the layout decomposition unit 380 that may be employed by various embodiments of the disclosed techniques. In this example, the heuristic coloring unit 381, the exact coloring unit 382, the solution assembler unit 383 and the density balancing unit 384 are arranged in sequence. The functions of the first two units 381 and 382 will be discussed in detail later. One of the functions performed by the solution assembler unit 383 is to adjust the colors of separate pieces so that the coloring is compatible in the original coloring graph. The density balancing unit 384 is configured to ensure vertices are evenly distributed among different colors (masks).

As will also be discussed in more detail below, some implementations of the layout decomposition tool 300 may cooperate with (or incorporate) one or more of an input database 305 and an output database 385. While the input database 305 and the output database 385 are shown as separate units in FIG. 3A, a single data storage medium may be used to implement some or both of these databases.

According to some embodiments of the disclosed techniques, one or more of the coloring graph generation unit 320, the graph simplification system 350 and the layout decomposition unit 380 are implemented by one or more computing systems, such as the computing system illustrated in FIGS. 1 and 2, executing programmable instructions. Correspondingly, some other embodiments of the disclosed techniques may be implemented by software-executable instructions, stored on a non-transitory computer-readable medium, for instructing a computing system to perform functions of one or more of the coloring graph generation unit 320, the graph simplification system 350 and the layout decomposition unit 380. As used herein, the term "non-transitory computer-readable medium" refers to computer-readable medium that are capable of storing data for future retrieval, and not for propagating electro-magnetic waves. The non-transitory computer-readable medium may be, for example, a magnetic storage device, an optical storage device, a "punched" surface type device, or a solid state storage device.

Figure 4:
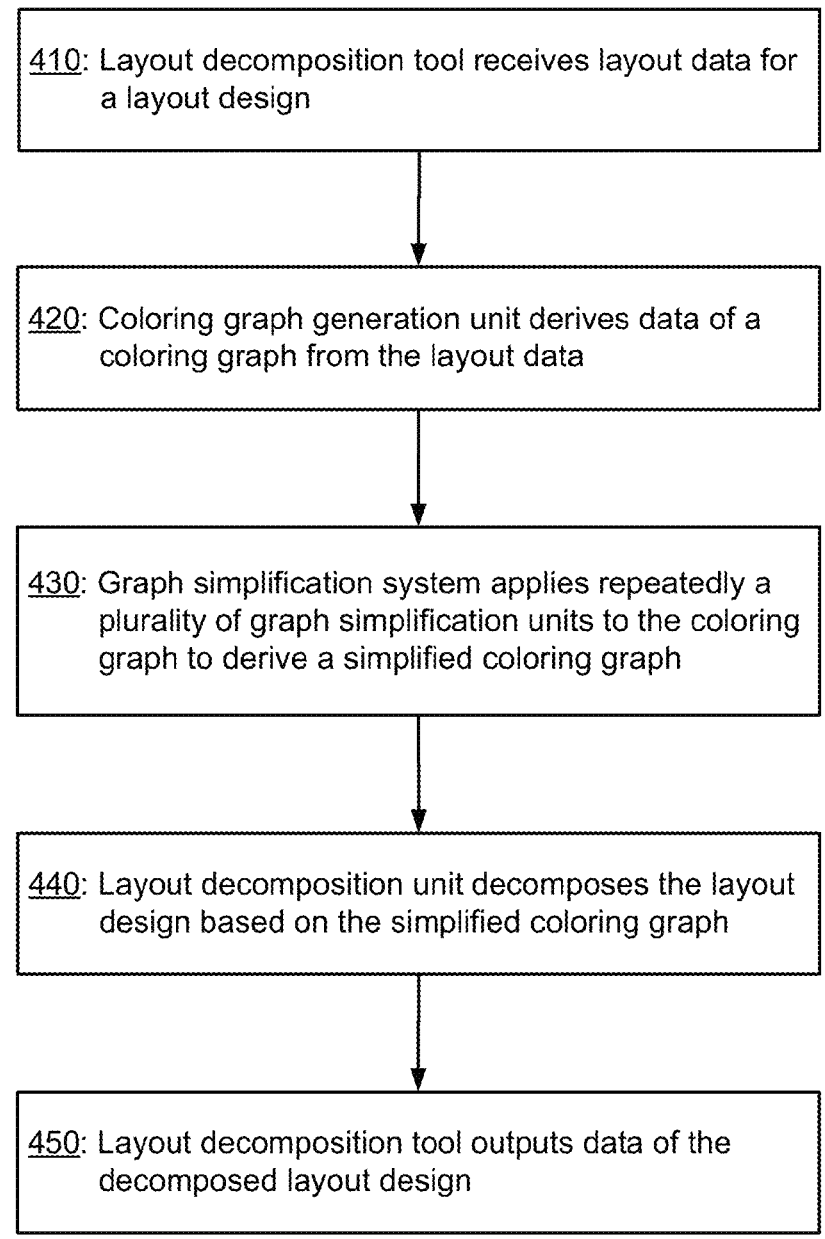
FIG. 4 illustrates an example of a flow chart describing a method of layout decomposition for multiple patterning lithography that may be employed according to various embodiments of the disclosed techniques.

For ease of understanding, methods of layout decomposition for multiple patterning lithography that may be employed according to various embodiments of the disclosed techniques will be described with reference to the layout decomposition tool 300 in FIG. 3A and the flow chart 400 illustrated in FIG. 4. It should be appreciated, however, that alternate implementations of a layout decomposition tool may be used to perform the methods of layout decomposition illustrated by the flow chart 400 according to various embodiments of the disclosed techniques. Likewise, the layout decomposition tool 300 may be employed to perform other methods of layout decomposition according to various embodiments of the disclosed techniques.

Initially, in operation 410 of the flowchart 400, the layout decomposition tool 300 receives layout data for a layout design, corresponding to at least a portion of an integrated circuit. The layout data comprise mask assignment information for some layout features. With various examples of the disclosed techniques, a layout feature may be a portion or the entirety of a geometric element, or a particular arrangement of geometric elements. The mask assignment information may comprise information based on minimum spacing information. For example, two layout features may need to be assigned to two different masks if the shortest distance between them is less than a threshold value.

The mask assignment information may also comprise information derived based on device information such as current mirrors and differential pairs. As will be appreciated by those of ordinary skill in the art, both current mirrors and differential pairs require transistors with similar if not identical operating characteristics. Channel width and length are critical dimensions for a transistor. To ensure that two transistors have similar performance, their channels may need to be printed onto a substrate using the same mask.

Design hierarchy may further impose limitations on mask assignments for certain layout features. IP blocks may still further add constraints. For example, an IP provider may specify certain pins of an IP block to be assigned to certain masks.

Next, in operation 420, the coloring graph generation unit 320 derives data of a coloring graph from the layout data. As will be appreciated by those of ordinary skill in the art, a graph is a representation of a set of objects with specific relationships. The objects can be visually represented by a collection of nodes (also referred to as vertices), with the relationships between the objects being represented by lines (also referred to as edges) connecting various pairs of vertices. With a coloring graph according to various implementations of the disclosed techniques, the vertices represent layout features in the layout design while lines between pairs of vertices indicate mask assignment information between corresponding layout features Next, in operation 430, the graph simplification system 350 applies repeatedly a plurality of graph simplification units to the coloring graph to derive a simplified coloring graph. If the number of vertices and edges can be reduced and/or a connected component in a coloring graph can be partitioned into a plurality of small components with the colorability being equivalent to that of the connected component, then the coloring process for layout decomposition can be significantly accelerated.

The plurality of graph simplification units may comprise one or more of the seven graph simplification units noted previously. The first graph simplification unit is configured to simplify a graph by combining same color vertices. These same color vertices are connected by edges indicating the same color. After the simplification, only edges indicating different colors are left.

The second graph simplification unit is configured to simplify a graph by separating biconnected components. To explain the separating biconnected components, definitions of several terms are given here. A connected component is a subgragh in which any two vertices are connected to each other by paths, and which is connected to no additional vertices in a supergraph. An articulation point is any vertex whose removal (together with the removal of any incident edges) increases the number of connected components. A subgraph is biconnected if it contains no articulation point. A bi-connected component is a maximal bi-connected subgraph.

Figure 6A:
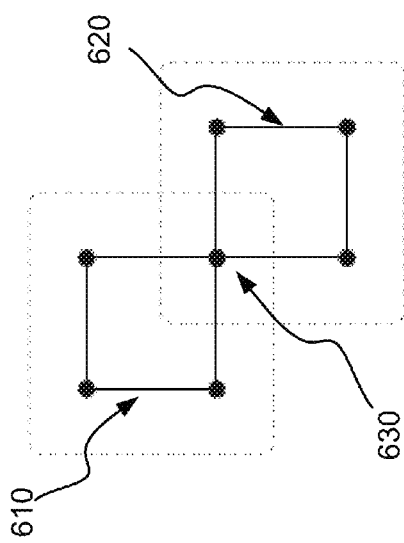
FIG. 6A illustrates an example of two biconnected components sharing a vertex.
Figure 6B:
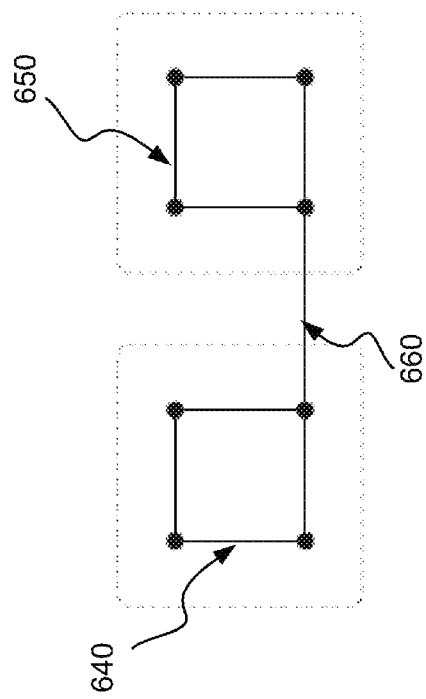
FIG. 6B illustrates an example of two biconnected components connected through an edge.

Biconnected components in a connected component share at most one vertex. Suppose a 3-coloring solution is found for each of two biconnected components that shares one vertex. If the shared vertex is assigned to different colors in the two 3-coloring solutions, a permutation (rotation) of the 3 colors in one of the 3-coloring solutions will result in a valid 3-coloring solution for the combined graph. This shows that the 3-colorability of two biconnected components sharing a vertex is equivalent to that of the two separate biconnected components. The same holds true for two biconnected components that are connected by one edge. Accordingly, the graph partitioning unit 360 can separate biconnected components through the shared vertex or by removing the edge through which the biconnected components to simplify the coloring graph. FIG. 6A illustrates an example of two biconnected components (610 and 620) sharing a vertex 630; FIG. 6B illustrates an example of two biconnected components (640 and 650) connected through an edge 660. In both cases, two separate biconnected components can be obtained after the graph partitioning process.

Figure 8:
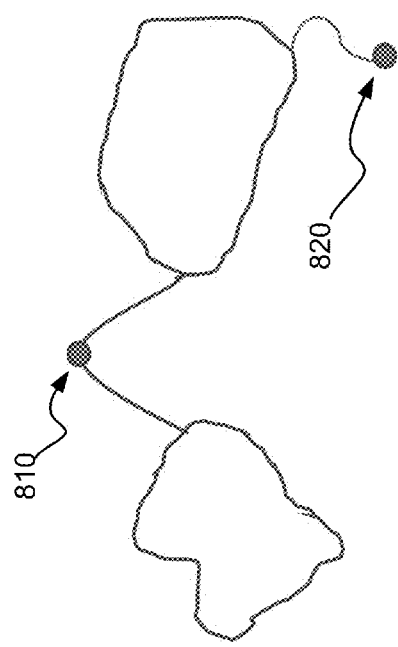
FIG. 8 illustrates an example of a vertex of degree two and an example of a vertex of degree one.

The third graph simplification unit is configured to simplify a graph by removing vertices of degree n (n is less than the number of colors used for graph coloring). In a case of 3-coloring (associated with triple patterning lithography), vertices of degree less than or equal to two are "removed" from further graph simplification. A vertex of degree less than or equal to two is a vertex that is connected to at most two other vertices. FIG. 8 illustrates an example of a vertex of degree two (810) and an example of a vertex of degree one (820). For this type of vertices, a color compatible with its connected neighbor(s) in 3-coloring can always be found. By removing them, the coloring graph becomes simpler for coloring.

The fourth graph simplification unit is configured to simplify a graph by collapsing a pair of n-vertex complete graphs that share a (n−1)-vertex complete graph (n is the number of colors for graph coloring). A complete graph is a graph in which every pair of distinct vertices is connected by a unique edge. In the case of 3-coloring, a 3-vertex complete graph is a triangle and a two-vertex complete graph is a line segment. A pair of triangles sharing an edge (line segment) forms a diamond. A diamond graph has four vertices and five edges. Each of the five edges is a conflict edge indicating that the connected two vertices should be assigned to different colors (i.e., that the corresponding layout features should be assigned to separate complementary lithographic masks).

Figure 5:
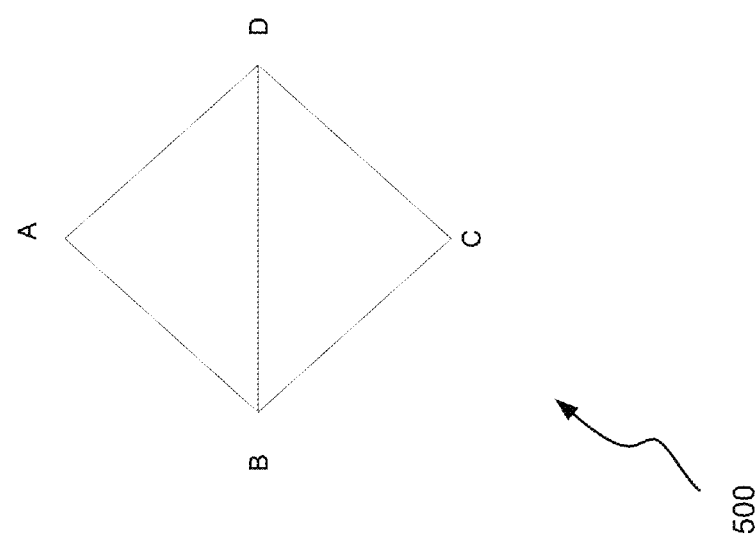
FIG. 5 illustrates an example of a diamond graph that can be reduced to a triangle graph according to various embodiments of the disclosed techniques.

FIG. 5 illustrates an example of collapsing a diamond graph. In the figure, diamond graph 500 has four vertices 501, 503, 505 and 507 and five conflict lines 509, 511, 513, 515 and 517. Due to the conflict edge 517, the vertices 503 and 507 must be assigned to two different colors in a three color set for coloring. The other four conflict edges thus dictate the vertices 501 and 505 must be assigned to the same color—the third color in the three color set. Accordingly, the vertices 501 and 505 can be combined together, collapsing the diamond graph 500 into a triangle graph.

Figure 7A:
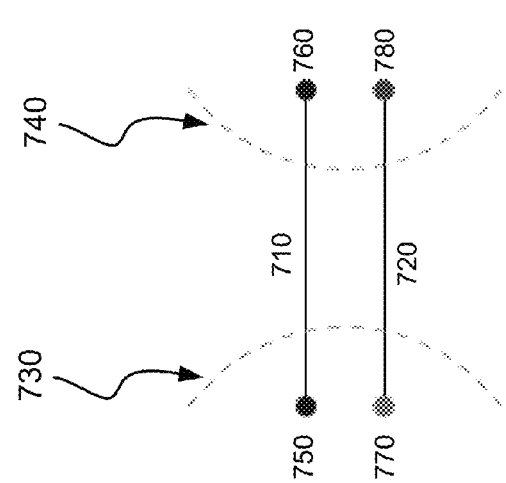
FIGS. 7A-C illustrates a pair of subgraphs connected by two edges.
Figure 7B:
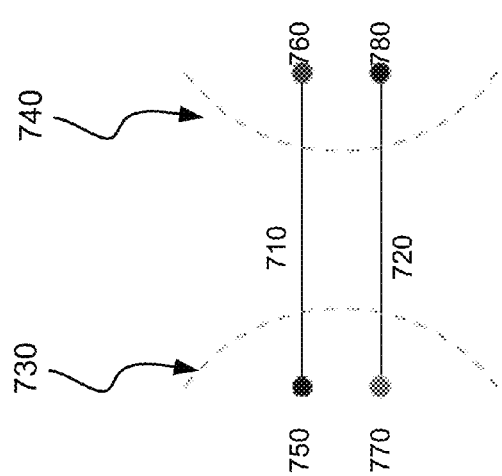
Figure 7C:
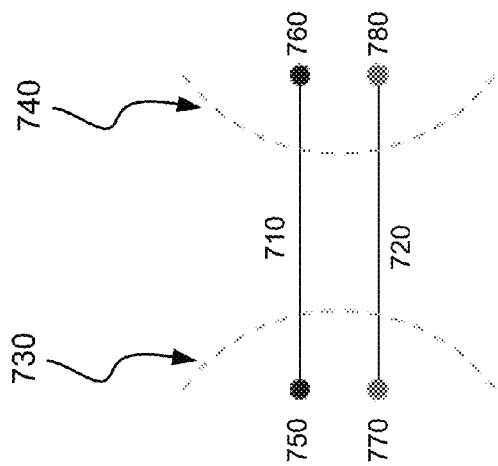

The fifth graph simplification unit is configured to simplify a graph by separating subgraphs connected by n edges (n is less than the number of colors used for graph coloring). In the three-coloring case, any two subgraphs connected by one or two edges may be separated. FIGS. 7A-C illustrates why two subgraphs connected by two edges can be partitioned without losing the original 3-colorability. Removing the two conflict edges 710 and 720 results in two subgraphs 730 and 740. Assume 3-coloring solutions are found for the two individual subgraphs. FIG. 7A illustrates a possible coloring result in which the same color is assigned to one (750/760) of the two pairs of vertices; FIG. 7B illustrates another possible coloring result in which the same color is assigned to both pairs of vertices (750/760, 770/780). To find a 3-coloring solution for the original connected subgraphs, a simple color permutation (rotation) can be performed, as shown in FIG. 7C. The same reasoning applies to subgraphs connected by one edge.

Figure 9:
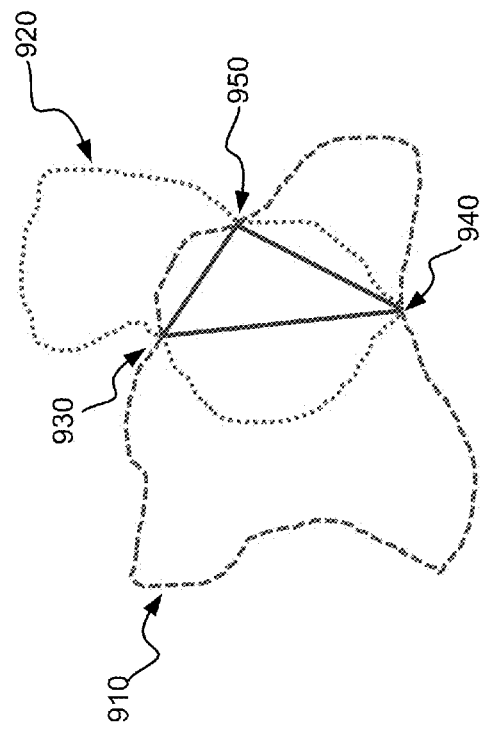
FIG. 9 illustrates an example of two subgraphs sharing three vertices of a triangle.

The sixth graph simplification unit is configured to simplify a graph by separating subgraphs that share and only share vertices of a complete graph on n vertices (n is less than or equal to the number of colors used for graph coloring). FIG. 9 illustrates an example of two subgraphs (910 and 920) sharing three vertices of a triangle (930, 940 and 950). For 3-coloring, the subgraphs 910 and 920 can be separated and colored independently. The vertices 930, 940 and 950 must have different colors in either of the two subgraphs because they form a complete graph. If they match each other, the two subgraphs can be combined directly. If not, a simple color permutation needs to be performed for one of the subgraphs.

Figure 10:
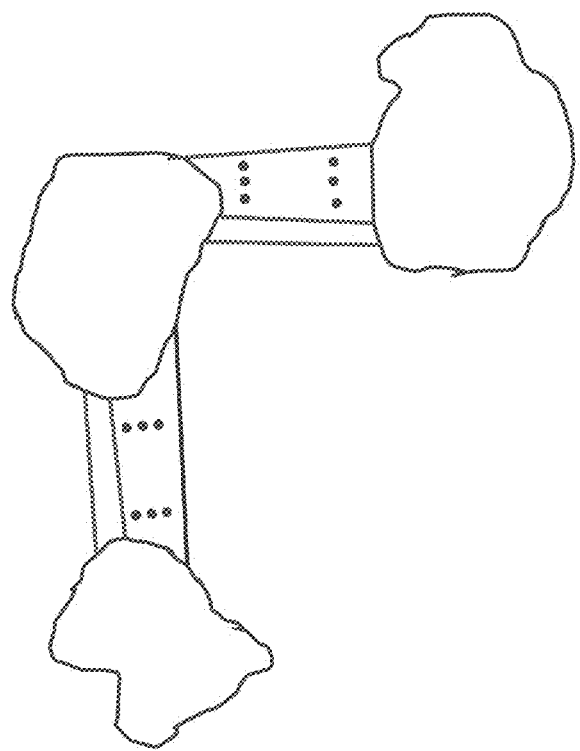
FIG. 10 illustrates an example of three subgraphs connected by more than 3 edges in series.

The seventh graph simplification unit is configured to simplify a graph by separating subgraphs connected by n edges (n is greater than or equal to the number of colors used for graph coloring). An example of three subgraphs connected in this way is illustrated in FIG. 10. As discussed above, the fifth graph simplification unit can be employed when subgraphs are connected by edges of which the number is less than the number of colors. If the number of the connecting edges is greater than or equal to the number of colors, simple partition will not suffice. Multiple coloring solutions for each subgraph in a pair need to be computed and a match may be determined by comparing these solutions.

While the above seven graph simplification units are described separately, each may operate alone or along with one or more of the others and/or those not described here as a single graph simplification unit.

The repeated application of the plurality of graph simplification units comprises applying one graph simplification unit in the plurality of graph simplification units to a part or a whole of the coloring graph to derive a first intermediate graph, applying one or more other graph simplification units in the plurality of graph simplification units to a part or a whole of the first intermediate graph to derive a second intermediate graph, and applying the one graph simplification unit again to a part or a whole of the second intermediate graph if the part or the whole of the second intermediate graph can be simplified by the one graph simplification unit. This may be implemented by different configurations of the graph simplification system 350.

In some embodiments of the disclosed techniques, the plurality of graph simplification units are arranged in a loop and applied in series as shown FIG. 3B. The order may be set dynamically depending upon information of the data such as the processing history. In some other embodiments of the disclosed techniques, a graph simplification control unit is inserted to manage the plurality of graph simplification units.

The graph simplification system 350 may terminate the operation 430 until no further simplification can be achieved or a user-defined termination condition is met. One example of the user-defined termination condition is the time limit.

After a simplified coloring graph is derived, in operation 440, the layout decomposition unit 380 decomposes the layout design based on the simplified coloring graph to generate decomposing information. The layout decomposition unit 380 may first attempt to find a 3-coloring solution for the simplified coloring graph. In some situations, the simplified coloring graph contains only simple subgraphs and a coloring solution can be readily obtained. In some other situations, a heuristic method may be needed for searching for a coloring solution for one or more complex subgraphs. As shown in FIG. 3D, the layout decomposition unit 380 may comprise a heuristic coloring unit 381.

Layout designs, generated by designers, may have styles from which help hints may be derived. For example, vertices may be ranked and sorted according to some criteria. The layout decomposition unit 380 may try to color in order with two colors as much as possible. The third color will be used to resolve any 2-color conflicts. If a conflict cannot be solved, the vertex involved will be moved to the front in the list of vertices to repeat the above process.

The layout decomposition unit 380 may also use heuristic methods described in a paper by Lim et al., "Heuristic methods for graph coloring problems," ACM Symposium on Applied Computing, pp. 933-939, which is incorporated herein by reference.

If the heuristic approach fails to provide a 3-coloring solution, an exact coloring unit 382 shown in FIG. 3D may be employed by the layout decomposition unit 380 to continue the coloring process. The selection of the exact algorithm may be made based on its amenability to parallel processing and/or the base of the exponential. The base of the exponential has a significant influence on the runtime. With the base being 1.9 for A and 2 for B, algorithm A is twice as fast as algorithm B when n=14.

If a coloring solution for the simplified coloring graph is found, the layout decomposition unit 380 may convert the coloring solution to layout data for three masks as the decomposing information. If a coloring solution cannot be found for one or more subgraphs at all or within a predetermined time period, the layout decomposition unit 380 may include corresponding layout information in the decomposing information.

In operation 450, the layout decomposition tool 300 stores the decomposing information.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed techniques. Rather, the scope of the disclosed techniques is defined by the following claims and their equivalents. We therefore claim as our disclosed techniques all that comes within the scope and spirit of these claims.

What is claimed is:

1. One or more non-transitory computer-readable media storing computer-executable instructions for causing one or more processors to perform a method of layout decomposition, the method comprising:

receiving layout data for a layout design, the layout design corresponding to at least a portion of an integrated circuit, the layout data comprising mask assignment information for some layout features;

deriving data of a coloring graph from the layout data, the coloring graph comprising vertices for layout features in the layout design and edges between some pairs of vertices indicating the mask assignment information;

applying repeatedly a plurality of graph simplification units to the coloring graph to derive a simplified coloring graph, wherein the applying repeatedly comprises applying one graph simplification unit in the plurality of graph simplification units to a part or a whole of the coloring graph to derive a first intermediate graph, applying one or more other graph simplification units in the plurality of graph simplification units to a part or a whole of the first intermediate graph to derive a second intermediate graph, and applying the one graph simplification unit again to a part or a whole of the second intermediate graph to simplify the part or the whole of the second intermediate graph by the one graph simplification unit, and wherein the applying repeatedly continues until no further simplification is achievable or a user-defined termination condition is met;

decomposing, as part of a multiple patterning lithography process, the layout design based on the simplified coloring graph to generate decomposition information; and storing the decomposition information.

2. The one or more non-transitory computer-readable media recited in claim 1, wherein the mask assignment information comprises:

mask assignment information derived based on device information, mask assignment information derived based on minimum spacing information, mask assignment information derived based on hierarchical information, mask assignment information derived based on cell information, or any combination thereof.

3. The one or more non-transitory computer-readable media recited in claim 1, wherein the plurality of graph simplification units comprises some or all of a graph simplification unit configured to simplify a graph by collapsing a pair of n-vertex complete graphs that share a (n−1)-vertex complete graph, wherein n is less than or equal to a number of colors used for graph coloring, wherein the number of colors used for graph coloring is equal to a number of masks for which the layout design is to be decomposed, a graph simplification unit configured to simplify a graph by separating biconnected components, a graph simplification unit configured to simplify a graph by combining same color vertices, a graph simplification unit configured to simplify a graph by removing vertices of degreem, wherein m is less than the number of colors used for graph coloring, a graph simplification unit configured to simplify a graph by separating subgraphs connected by k edges, wherein k is less than the number of colors used for graph coloring, a graph simplification unit configured to simplify a graph by separating subgraphs that share and only share vertices of a complete graph on j vertices, wherein j is less than or equal to the number of colors used for graph coloring, and a graph simplification unit configured to simplify a graph by separating subgraphs connected by p edges, wherein p is greater than or equal to the number of colors used for graph coloring.

4. The one or more non-transitory computer-readable media recited in claim 1, wherein the decomposing comprises:

applying, if needed, a heuristic method for coloring.

5. The one or more non-transitory computer-readable media recited in claim 4, wherein the decomposing further comprises:

applying an exact coloring algorithm if needed.

6. The one or more non-transitory computer-readable media recited in claim 1, wherein the decomposition information comprises information of one or more layout regions that are indecomposable.

7. A method of layout decomposition, comprising:

with a computer;

receiving layout data for a layout design, the layout design corresponding to at least a portion of an integrated circuit, the layout data comprising mask assignment information for some layout features;

deriving data of a coloring graph from the layout data, the coloring graph comprising vertices for layout features in the layout design and edges between some pairs of vertices indicating the mask assignment information;

applying repeatedly a plurality of graph simplification units to the coloring graph to derive a simplified coloring graph, wherein the applying repeatedly comprises applying one graph simplification unit in the plurality of graph simplification units to a part or a whole of the coloring graph to derive a first intermediate graph, applying one or more other graph simplification units in the plurality of graph simplification units to a part or a whole of the first intermediate graph to derive a second intermediate graph, and applying the one graph simplification unit again to a part or a whole of the second intermediate graph to simplify the part or the whole of the second intermediate graph by the one graph simplification unit, and wherein the applying repeatedly continues until no further simplification is achievable or a user-defined termination condition is met;

decomposing, as part of a multiple patterning lithography process, the layout design based on the simplified coloring graph to generate decomposition information; and storing the decomposition information.

8. The method recited in claim 7, wherein the mask assignment information comprises:

mask assignment information derived based on device information, mask assignment information derived based on minimum spacing information, mask assignment information derived based on hierarchical information, mask assignment information derived based on cell information, or any combination thereof.

9. The method recited in claim 7, wherein the plurality of graph simplification units comprises some or all of a graph simplification unit configured to simplify a graph by collapsing a pair of n-vertex complete graphs that share a (n−1)-vertex complete graph, wherein n is less than or equal to a number of colors used for graph coloring, wherein the number of colors used for graph coloring is equal to a number of masks for which the layout design is to be decomposed, a graph simplification unit configured to simplify a graph by separating biconnected components, a graph simplification unit configured to simplify a graph by combining same color vertices, a graph simplification unit configured to simplify a graph by removing vertices of degree m, wherein m is less than the number of colors used for graph coloring, a graph simplification unit configured to simplify a graph by separating subgraphs connected by k edges, wherein k is less than the number of colors used for graph coloring, a graph simplification unit configured to simplify a graph by separating subgraphs that share and only share vertices of a complete graph on j vertices, wherein j is less than or equal to the number of colors used for graph coloring, and a graph simplification unit configured to simplify a graph by separating subgraphs connected by p edges, wherein p is greater than or equal to the number of colors used for graph coloring.

10. The method recited in claim 7, wherein the decomposing comprises:

applying, if needed, a heuristic method for coloring.

11. The method recited in claim 10, wherein the decomposing further comprises:

applying an exact coloring algorithm if needed.

12. The method recited in claim 7, wherein the decomposition information comprises information of one or more layout regions that are indecomposable.

13. A system for layout decomposition, comprising:

a coloring graph generation unit configured to derive data of a coloring graph from layout data for a layout design, the layout design corresponding to at least a portion of an integrated circuit, the layout data comprising mask assignment information for some layout features, the coloring graph comprising vertices representing layout features in the layout design and edges between some pairs of vertices indicating the mask assignment information;

a graph simplification system configured to apply repeatedly a plurality of graph simplification units to the coloring graph to derive a simplified coloring graph, wherein the applying repeatedly comprises applying one graph simplification unit in the plurality of graph simplification units to a part or a whole of the coloring graph to derive a first intermediate graph, applying one or more other graph simplification units in the plurality of graph simplification units to a part or a whole of the first intermediate graph to derive a second intermediate graph, and applying the one graph simplification unit again to a part or a whole of the second intermediate graph to simplify the part or the whole of the second intermediate graph by the one graph simplification unit, and wherein the applying repeatedly continues until no further simplification is achievable or a user-defined termination condition is met; and a layout decomposition unit configured to decompose, as part of a multiple patterning lithography process, the layout design based on the a simplified coloring graph generated by the graph reduction unit and/or the graph partitioning unit to generate decomposition information.

14. The system recited in claim 13, wherein the mask assignment information comprises:

mask assignment information derived based on device information, mask assignment information derived based on minimum spacing information, mask assignment information derived based on hierarchical information, mask assignment information derived based on cell information, or any combination thereof.

15. The system recited in claim 13, wherein the plurality of graph simplification units comprises some or all of a graph simplification unit configured to simplify a graph by collapsing a pair of n-vertex complete graphs that share a (n−1)-vertex complete graph, wherein n is less than or equal to a number of colors used for graph coloring, wherein the number of colors used for graph coloring is equal to a number of masks for which the layout design is to be decomposed, a graph simplification unit configured to simplify a graph by separating biconnected components, a graph simplification unit configured to simplify a graph by combining same color vertices, a graph simplification unit configured to simplify a graph by removing vertices of degree m, wherein m is less than the number of colors used for graph coloring, a graph simplification unit configured to simplify a graph by separating subgraphs connected by k edges, wherein k is less than the number of colors used for graph coloring, a graph simplification unit configured to simplify a graph by separating subgraphs that share and only share vertices of a complete graph on j vertices, wherein j is less than or equal to the number of colors used for graph coloring, and a graph simplification unit configured to simplify a graph by separating subgraphs connected by p edges, wherein p is greater than or equal to the number of colors used for graph coloring.

16. The system recited in claim 13, wherein the decomposing comprises:

applying, if needed, a heuristic method for coloring.

17. The system recited in claim 16, wherein the decomposing further comprises:

applying an exact coloring algorithm if needed.

18. The system recited in claim 13, wherein the decomposition information comprises information of one or more layout regions that are indecomposable.

* * * * *